United States Patent
Lee et al.

(10) Patent No.: US 10,879,530 B2
(45) Date of Patent: Dec. 29, 2020

(54) ANODE MATERIAL OF NANO-SILICON HAVING MULTILAYER-GRAPHENE AS CARRIER AND COATED WITH SILICON SUBOXIDE AND WITH AMORPHOUS CARBON LAYER AND METHOD FOR FABRICATING THE SAME

(71) Applicant: National Chung-Shan Institute of Science and Technology, Taoyuan (TW)

(72) Inventors: Po-Han Lee, Taipei (TW); Biing-Jyh Weng, New Taipei (TW); Chuen-Ming Gee, Taoyuan (TW); Bo-Wen Chen, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 64 days.

(21) Appl. No.: 16/218,486

(22) Filed: Dec. 13, 2018

(65) Prior Publication Data
US 2020/0194787 A1    Jun. 18, 2020

(51) Int. Cl.
*H01M 4/38*    (2006.01)
*H01M 4/66*    (2006.01)
(Continued)

(52) U.S. Cl.
CPC ........... *H01M 4/386* (2013.01); *H01M 4/663* (2013.01); *H01M 4/0471* (2013.01); *H01M 2004/021* (2013.01)

(58) Field of Classification Search
CPC ... H01B 1/04; H01B 1/08; H01B 1/18; H01B 1/24; H01M 4/133; H01M 4/134;
(Continued)

(56) References Cited

U.S. PATENT DOCUMENTS 9,966,594 B2 * 5/2018 Kim .................... H01M 4/1393
9,972,836 B2 * 5/2018 Yang ................ C04B 35/62884
(Continued)

FOREIGN PATENT DOCUMENTS

CN    103326023 A    9/2013
CN    106784640 A  *  5/2017 .............. H01M 4/38
(Continued)

OTHER PUBLICATIONS

English machine translation of Liu et al. (CN 108336342 A). (Year: 2018).*
(Continued)

*Primary Examiner* — Matthew R Diaz
(74) *Attorney, Agent, or Firm* — Winston Hsu (57) ABSTRACT

The present invention provides an anode material of nano-silicon. The anode material has multilayer-graphene as a carrier and is coated with silicon suboxide and with an amorphous carbon layer. The anode material has multilayer-graphene to serve as a carrier, nano-silicon which is adsorbed on the multilayer-graphene and both the multilayer-graphene and the nano-silicon serve as a core, silicon suboxide and the amorphous carbon layer to cover the multilayer-graphene and the nano-silicon, and a plurality of buffering holes which are disposed on the anode material to provide buffering space. An anode material of high quality is realized by coating multilayer-graphene which serves as a carrier of nano-silicon with silicon suboxide and with the amorphous carbon layer.

4 Claims, 9 Drawing Sheets

(51) Int. Cl.
*H01M 4/02* (2006.01)
*H01M 4/04* (2006.01)

(58) Field of Classification Search
CPC ...... H01M 4/362; H01M 4/364; H01M 4/366; H01M 4/48; H01M 4/386; H01M 4/625; H01M 4/663; H01M 4/666; H01M 4/667; H01M 2004/021; H01M 2004/027; C01B 32/182; C01B 32/194; C01B 33/113
See application file for complete search history.

(56) References Cited

U.S. PATENT DOCUMENTS

| | | | | |
|---|---|---|---|---|
| 2006/0068287 | A1* | 3/2006 | Morita | H01M 10/052 429/223 |
| 2012/0251886 | A1* | 10/2012 | Yushin | H01M 4/78 429/231.5 |
| 2014/0370387 | A1* | 12/2014 | Anguchamy | H01M 10/052 429/221 |
| 2018/0083272 | A1* | 3/2018 | Son | H01M 4/587 |
| 2018/0226169 | A1* | 8/2018 | Son | H01M 4/134 |
| 2020/0152970 | A1* | 5/2020 | Park | H01M 4/628 |

FOREIGN PATENT DOCUMENTS

| | | | | |
|---|---|---|---|---|
| CN | 106848264 A | | 6/2017 | |
| CN | 107204445 A | | 9/2017 | |
| CN | 108336342 A | * | 7/2018 | |
| CN | 108336342 A | | 7/2018 | |
| CN | 108630919 A | | 10/2018 | |
| CN | 108878834 A | * | 11/2018 | ............ H01M 4/38 |
| CN | 109638229 A | | 4/2019 | |
| JP | 2012-526343 A | | 10/2012 | |
| JP | 2017-120787 A | | 7/2017 | |
| JP | 2018-48070 A | | 3/2018 | |
| JP | 2018-520494 A | | 7/2018 | |
| WO | WO-2019013525 A2 | * | 1/2019 | ............ H01M 4/38 |

OTHER PUBLICATIONS

English machine translation of Yang et al. (CN 106784640 A). (Year: 2017).*
English machine translation of Ren et al. (CN 108878834 A). (Year: 2018).*
Database WPI Week 201861 Thomson Scientific, London, GB; AN 2018-60867P, XP002797096, 2018.
Database WPI Week 201780 Thomson Scientific, London, GB; AN 2017-67697T, XP002797108, 2017.
Kara Evanoff et al., Nanosilicon-Coated Graphene Granules as Anodes for Li-Ion Batteries, Advanced Energy Materials, Wiley-VCH Verlag GMBH & Co. KGAA, vol. 1, 2011, pp. 495-498, XP002708787.
Database WPI Week 201954 Thomson Scientific, London, GB; AN 2019-38331U, XP002797089, 2019.
Kara Evanoff et al., Nanosilicon-Coated Graphene Granules as Anodes for Li-Lon Batteries, Advanced Energy Materials, 2011, vol. 1, pp. 495-498, 2011 Wiley-VCH Verlag Gmbh & Co. KGaA, Weinheim, XP002708787.
Database WPI Week 201408 Thomson Scientific, London, GB; AN 2013-V91887, XP002798850, 2013.
Database WPI Week 201761 Thomson Scientific, London, GB; AN 2017-42862V, XP002798855, Jun. 13, 2017.
Database WPI Week 201880 Thomson Scientific, London, GB; AN 2018-800894, XP002798856, Oct. 9, 2018.
Masafumi Arakawa, Introduction to particle size measurement, Journal of the Society of Powder Technology, Jun. 10, 1980, pp. 299-307, vol. 17, No. 6.

* cited by examiner

ANODE MATERIAL OF NANO-SILICON HAVING MULTILAYER-GRAPHENE AS CARRIER AND COATED WITH SILICON SUBOXIDE AND WITH AMORPHOUS CARBON LAYER AND METHOD FOR FABRICATING THE SAME

BACKGROUND OF THE INVENTION

1. Field of the Invention

The present invention generally relates to a method for producing an anode material by using nano-silicon and silicon suboxide, and in particular, the present invention is directed to an anode material of nano-silicon which has multilayer-graphene as a carrier and is coated with silicon suboxide and with an amorphous carbon layer for use in the application of the fabrication of an anode plate.

2. Description of the Prior Art

With the rapid development of the modern technology and of the quality of life, all kinds of 3 C high-tech electronic products tend to become light, thin, short, small and multi-functional while high-performance lithium batteries become available when the requirements, such as safe to use, low cost, high quality and friendly to the environment, of a battery are taken into consideration. Among them, an anode material of a lithium ion secondary battery may be made of materials such as mesocarbon microbeads, natural graphite, and artificial graphite.

At present, the application of an anode active material, a conductive agent and a mesophase carbon microbead-based carbon material is getting more and more useful, and the carbon material has excellent charging and discharging capacity, cycle performance and thermal stability, in particular, for use as a power source in a portable device of a lithium-ion batteries, a super-capacitor, and a solar cell.

In most of the lithium ion batteries, graphite serves as the anode material, and it has the advantages of long cycle life, stable voltage, fast charging and discharging . . . etc. However, due to lower theoretical capacitance of carbon, it limits the increase of the energy density of a lithium ion battery. Nowadays, it is still urgent to find an alternative material to increase the capacity of the batteries. When silicon serves as an anode material of a lithium ion battery, it would have higher theoretical capacity than that of the graphite-based carbon material. When a small amount of silicon is added to be mixed with a carbon material, the unit capacity of the anode may be greatly increased to be used in a lithium battery system of the next generation in the future. As an early approach for silicon/carbon material, $SiH_4$ is used by means of chemical vapor deposition so that nano-silicon is uniformly deposited on the porous carbon material, and the capacity can be increased from 330 mAh/g 360 mAh/g to approximately 1000 mAh/g-2000 mAh/g. This study confirms the practicability of the silicon/carbon material for use in the anode.

However, because the volume of silicon expands up to 4 times in the charging and discharging cycles, it causes irreversible defects on the surface of silicon and results in drawbacks, such as decreased battery capacity and lower Coulombic efficiency. Therefore, it is still needed in the industry to develop silicon suboxide or silicon/carbon anode material to suppress the volume expansion of silicon in the charging and discharging cycles by means of an oxide or a carbon layer. In such a way, the trade-off between the cost and efficiency can be simultaneously balanced so as to prepare an anode electrode of a high quality lithium ion battery.

SUMMARY OF THE INVENTION

In the light of the above drawbacks of the prior art, the main objective of the present invention is to provide an anode material of nano-silicon with multilayer-graphene as a carrier. The nano-silicon and the multilayer-graphene are coated with silicon suboxide (i.e. $SiO_x$) and with an amorphous carbon layer to integrate the multilayer-graphene, the nano-silicon, the amorphous carbon layer and a plurality of buffering holes . . . etc. to prepare an anode electrode of a high quality lithium battery.

In order to achieve the above objective, according to one aspect of the present invention, an anode material of nano-silicon with multilayer-graphene as a carrier is provided. The nano-silicon and the multilayer-graphene of the anode material are coated with silicon suboxide and with an amorphous carbon layer. The anode material includes multilayer graphene to serve as a carrier, nano-silicon which is adsorbed on the multilayer-graphene and both the multilayer-graphene and the nano-silicon serve as a core, silicon suboxide and an amorphous carbon layer to cover the multilayer-graphene and the nano-silicon, and a plurality of buffering holes which are disposed on the anode material to provide buffering space.

The particle size of the above nano-silicon may be in a range from 10 nm to 1000 nm, and a preferred embodiment of the particle size may be in a range from 50 nm to 300 nm. The nano-silicon may be the nano-silicon particles of the required particle size which are obtained by alkaline sodium hydroxide etching silicon powders. At the same time, hydroxyl groups may make the nano-silicon particles bonded to the multilayer-graphene to let the multilayer-graphene become a carrier so that the nano-silicon is adsorbed on the multilayer-graphene. The amorphous carbon layer is obtained from an organic carbon source through a high temperature thermal pyrolysis process. The organic carbon source may be selected from one of glucose, sucrose, citric acid, polyvinyl alcohol, polyethylene glycol, polyacrylonitrile, asphalt, a phenolic resin, polyaniline, an epoxy resin, polyvinylpyrrolidone and an unsaturated hydrocarbon gas, or a mixture thereof. The formation of the anode material with nano-silicon and carrier-serving multilayer-graphene which are coated with silicon suboxide and with an amorphous carbon layer of the present invention must undergo a calcination process. After the calcination process, the anode material with nano-silicon and carrier-serving multilayer-graphene which are coated with silicon suboxide and with an amorphous carbon layer of the present invention is washed with deionized water, glycerol, or ethanol to obtain the anode material which has a plurality of buffering holes and multilayer-graphene to serve as a carrier, and is coated with silicon suboxide and with an amorphous carbon layer.

In order to achieve the above objective, according to another aspect of the present invention, a method for fabricating an anode material having multilayer-graphene as a carrier and coated with silicon suboxide and with an amorphous carbon layer is provided. The method includes the steps of:

(A) providing an etchant and a silicon-containing starting material to obtain a mixture solution after a mixing process, and adding a terminator to the mixture solution to make the mixture solution become a neutral solution;

(B) adding multilayer-graphene to the mixture solution for mixing before adding an organic carbon source;

(C) subjecting the mixture solution in the step (B) to a calcination process to obtain a core shell material; and (D) subjecting the core shell material to a pulverizing and sieving process to obtain an anode material which has a plurality of buffering holes and multilayer-graphene as a carrier and is coated with silicon suboxide and with an amorphous carbon layer, before said core shell material is washed with a solvent.

The above etchant may be selected from an alkaline solution, such as a sodium hydroxide (NaOH) solution or a potassium hydroxide (KOH) solution, but the present invention is not limited thereto. The silicon-containing starting material may be selected from silicon powder or silicon suboxide powder. The terminator may be selected from one of hydrogen chloride (HCl), nitric acid ($HNO_3$), sulfuric acid ($H_2SO_4$), citric acid and acetic acid, or a mixture thereof. The main purpose of the addition of the terminator is to bring the pH value of the solution to 7 by a neutralization reaction so as to stop the alkaline etching reaction. The nano-silicon or $SiO_x$ which is produced by the alkaline etching reaction may serve as a central core of the subsequent core-shell material, and the $[SiO_4]^{4-}$ ions becomes silicon suboxide ($SiO_x$) to cover the center core (nano-silicon or $SiO_x$) after a thermal treatment in the step (C) under an inert atmosphere. The concentration of the NaOH alkaline solution may be from 0.025 M to 2.5 M. The time for the etching reaction of NaOH (the mixing process) may be 0.5 hour to 24 hours.

In the step (B), after the multilayer-graphene is added to the mixture solution for mixing, the silicon-containing starting material (silicon powder or silicon suboxide powder) generates hydroxyl groups by the alkali-etching of sodium hydroxide. Nano-silicon or silicon suboxide ($SiO_x$) is bonded to the multilayer-graphene by using the hydroxyl groups to make the multilayer-graphene become a carrier. Nano-silicon or silicon suboxide ($SiO_x$) adsorbs onto the multilayer-graphene. The organic carbon source may be selected from one of glucose, sucrose, citric acid, polyvinyl alcohol, polyethylene glycol, polyacrylonitrile, asphalt, phenolic resin, polyaniline, epoxy resin, polyvinylpyrrolidone and a unsaturated hydrocarbon gas, or a mixture thereof.

In the above step (C), the calcination process may have two procedures, such as a pre-oxidation calcination procedure and a calcination procedure. The temperature of the pre-oxidation calcination procedure may be in a range from 250° C. to 400° C., and the optimal range of the temperature is from 280° C. to 350° C. The calcination temperature of the calcination procedure may be in a range from 600° C. to 1000° C., and the optimal range of the temperature is from 800° C. to 900° C. After the calcination process, $[SiO_4]^{4-}$ ions become silicon suboxide ($SiO_x$), and the organic carbon source is pyrolyzed to become an amorphous carbon layer, and eventually a core shell material which has multilayer-graphene as a carrier (nano-silicon or silicon suboxide adsorbing onto the carrier) which is coated with silicon suboxide and with an amorphous carbon layer is formed. In the above step (D), a pulverizing procedure in the pulverizing and sieving process may be selected from at least one of machining, ball milling and grinding, but the present invention is not limited to these. The pulverizing and sieving process may use a sieve. The sieve may have a mesh number between 80 mesh and 600 mesh. In the step (D), the solvent may be selected from one of deionized water, glycerol and ethanol, or a mixture thereof. The solvent (for example, deionized water) washes off the by-products of NaOH and terminator after calcination, for example water-soluble carbonates such as $Na_2CO_3$, to wash away salts and to leave a plurality of holes. These holes may effectively serve as a buffering structure for the volume expansion of Si or of $SiO_x$ in the charging and discharging cycles.

The present invention prepares an anode electrode by applying an anode material which has multilayer-graphene to serve as a carrier and is coated with an amorphous carbon layer and silicon suboxide onto a metal foil. The anode material is obtained by mixing a binder, a conductive agent, a coating solvent, and the powdery silicon suboxide with a plurality of buffering holes. The binder may be selected from one of polyvinyldiene difluoride (PVDF), carboxylmethyl cellulose (CMC), styrene-butadiene rubber (SBR), alginate, chitosan, polyacrylic latex or a mixture thereof. The conductive agent may be selected from one of carbon black, carbon nanotubes, carbon fiber, graphene, graphite flakes or a mixture thereof. The coating solvent may be water or NMP.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Please refer to FIG. 14.

Please refer to FIG. 15.

DETAILED DESCRIPTION

Specific embodiments are provided to elaborate the practice of the present invention. The advantages and efficacy thereof would be readily appreciated by persons of ordinary skill in the art from the disclosure of the present invention.

The theoretical capacity of silicon as an anode material is approximately 3500 mAh/g, and partial amount of addition is capable of greatly increasing the overall energy density of the anode of a battery. However, due to the volume expansion of Si as many as 4 times in the charging and discharging cycles, irreversible defects occur on the surface of silicon and result in drawbacks, such as a decrease in battery capacity, or lower Coulombic efficiency . . . etc. One objective of the present invention is to solve the above problems by using a structure containing Si/SiO$_x$/MLG/C, whose outermost structure is SiO$_x$ along with amorphous carbon which is obtained from a thermal pyrolysis process of an organic carbon source to wrap Si/graphene inside the structure to form a core-shell structure. Such core-shell structure is capable of restricting the drastic volume expansion of silicon during the charging and discharging cycles, so that the silicon powder may not form major defects so as to maintain its conductive paths. The capacity of the anode material may be accordingly maintained within a given range. By changing the oxygen content on Si and controlling the graphene and the carbon layer, the capacity of the composite anode material which has nano-silicon wrapped inside of silicon suboxide and an amorphous carbon layer may be kept in a range of approximately 1600 mAh g$^{-1}$-1800 mAh g$^{-1}$ which is comparable with that of a commercial product.

Figure 1:
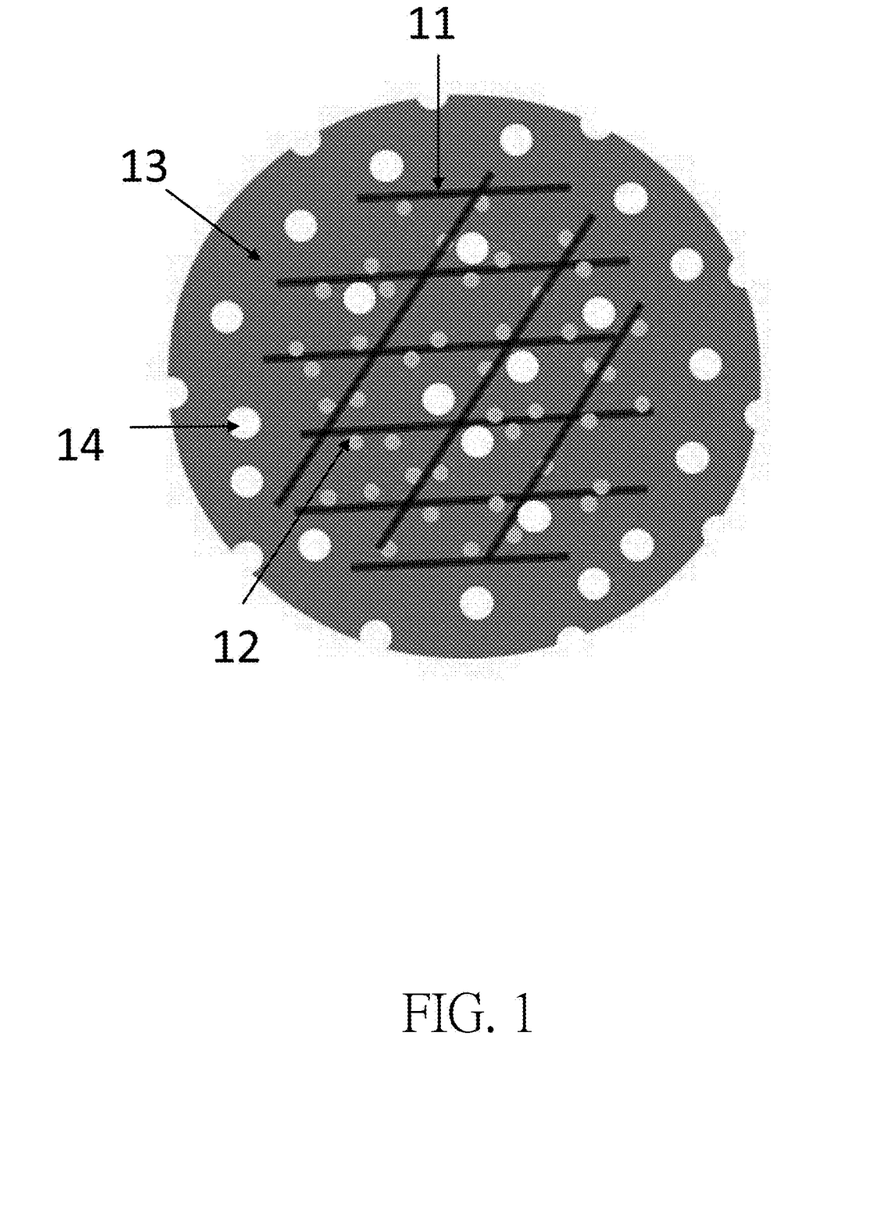
FIG. 1 illustrates a perspective view of an anode material of nano-silicon which has multilayer-graphene as a carrier and is coated with silicon suboxide and with an amorphous carbon layer.

Please refer to FIG. 1. FIG. 1 illustrates a perspective view of an anode material of nano-silicon which has multilayer-graphene as a carrier and is coated with silicon suboxide and with an amorphous carbon layer. As shown in FIG. 1, the present invention provides an anode material of nano-silicon with multilayer-graphene to serve as a carrier. Both the nano-silicon and the multilayer-graphene are coated with silicon suboxide and with an amorphous carbon layer. The anode material of nano-silicon includes: multilayer-graphene 11 to serve as a carrier, nano-silicon 12 adsorbed on the multilayer-graphene 11 and both the multilayer-graphene 11 and the nano-silicon 12 serving as a core, a silicon suboxide and amorphous carbon layer 13 to wrap the multilayer-graphene 11 and the nano-silicon 12, and a plurality of buffering holes 14 disposed on the anode material in order to provide sufficient buffering space.

Figure 2:
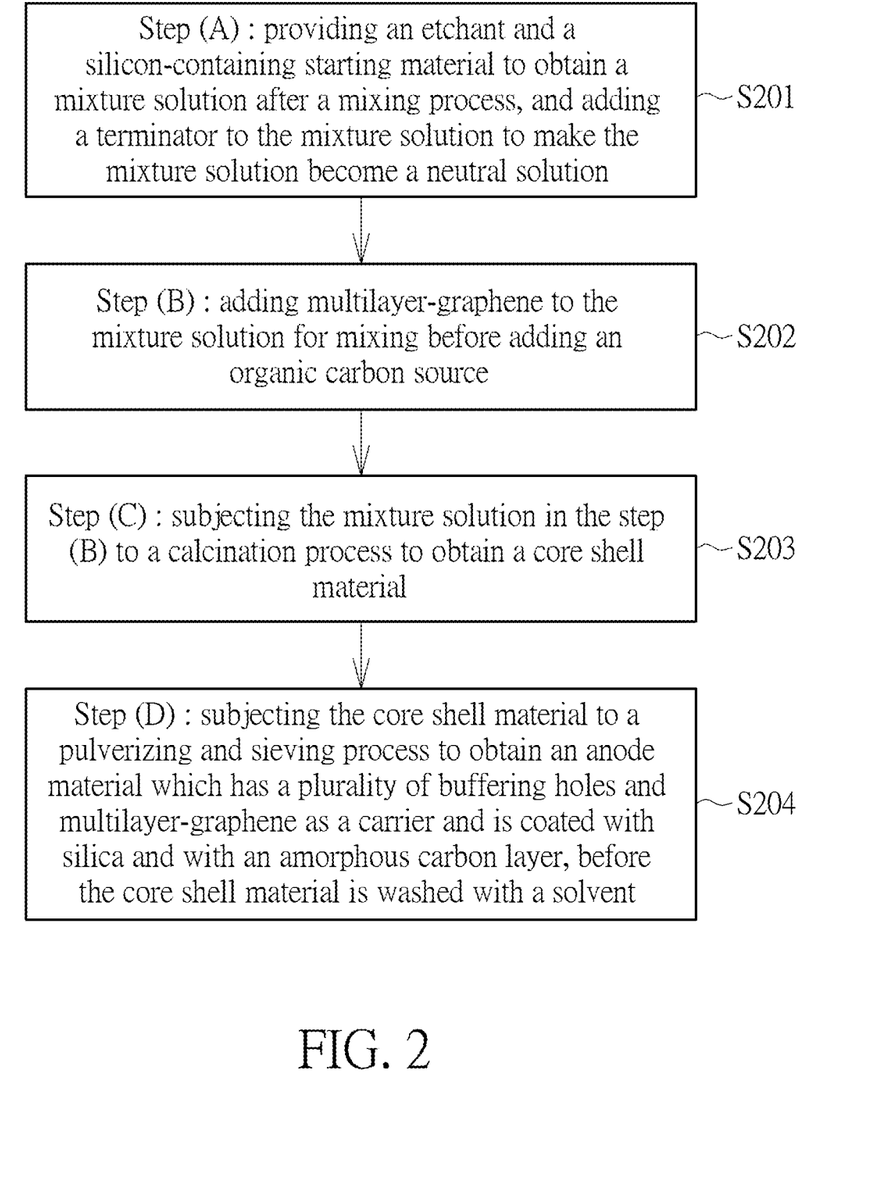
FIG. 2 illustrates a flow chart of a method for fabricating an anode material of nano-silicon which has multilayer-graphene as a carrier and is coated with silicon suboxide and with an amorphous carbon layer.

Please refer to FIG. 2. FIG. 2 illustrates a flow chart of a method for fabricating an anode material of nano-silicon which has multilayer-graphene as a carrier and is coated with silicon suboxide and with an amorphous carbon layer. As shown in FIG. 2, the present invention provides a method for fabricating an anode material of nano-silicon which has multilayer-graphene as a carrier and is coated with silicon suboxide and with an amorphous carbon layer. The method includes the steps of:
(A) providing an etchant and a silicon-containing starting material to obtain a mixture solution after a mixing process, and adding a terminator to the mixture solution to make the mixture solution become a neutral solution 5201;
(B) adding multilayer-graphene to the mixture solution for mixing before adding an organic carbon source 5202;
(C) subjecting the mixture solution in the step (B) to a calcination process to obtain a core shell material 5203; and
(D) subjecting the core shell material to a pulverizing and sieving process to obtain an anode material which has a plurality of buffering holes and multilayer-graphene as a carrier and is coated with silicon suboxide and with an amorphous carbon layer, before said core shell material is washed with a solvent 5204.

The [nano-silicon or SiO$_x$ or (nano-silicon and SiO$_x$)]/multilayer-graphene/(silicon suboxide+amorphous carbon) anode material of the present invention is mixed with a binder and with a conductive agent in a certain ratio to form a slurry then it is applied on a 10 μm copper foil. First, the solvent was dried at 60° C. and then it is baked in a vacuum oven at 110° C. for 24 hours to remove the solvent to obtain a finished electrode. The finished electrode is cut to form circular chips of 1.2 mm in diameter (12ϕ) for making CR2032 button-type lithium ion secondary batteries. The batteries are subjected to a capacity test of a half-cell (lithium metal as the counter electrode (1.5 mm diameter, 15ϕ)) which uses 1.0 M LiPF$_6$ in an EC (ethylene carbonate):FEC (floroethylene carbonate):DMC (dimethyl carbonate):EMC (ethylene methyl carbonate)=28:7:10:55 composite solvent with additional additives of 1% VC (vinylene carbonate) and 1.5% PS (1,3-propane sultone). The machine model for measuring the capacity is BAT-750B.

Example 1

500 mL of 0.25 mM NaOH solution is prepared and continuously stirred at 200 rpm. 25 g of 200 nm silicon powder is added to the above NaOH solution to undergo a reaction for 0.5 hour, and then citric acid is added and stirred as a terminator. The terminator is added to adjust the pH value to be 7 so that silicon stops reacting with NaOH. High temperature calcination is performed at 900° C. to carry out a carbonization treatment (calcination process). The obtained nano-silicon-based anode material (a structure of nano-silicon/(silicon suboxide+amorphous carbon)) is pulverized, grinded and sieved to mix the active materials: conductive agent:PAA:SBR:CMC at a proportion of 73:12:2.5:5.6:6.9 to form a slurry. In mixing, CMC is first mixed with PAA then the active materials and conductive agents are premixed by means of dry blending before they are added to the solution of CMC and PAA. At last, SBR is added and uniformly mixed. The obtained slurry is applied to a copper foil by doctor blade coating. This sample is called Si/SiO$_x$/C-0.5 h.

Example 2

500 mL of 0.25 mM NaOH solution is prepared and continuously stirred at 200 rpm. 25 g of 200 nm silicon powder is added to the above NaOH solution to undergo a reaction for 4 hour, and then citric acid is added and stirred as a terminator. The terminator is added to adjust the pH value to be 7 so that silicon stops reacting with NaOH. High temperature calcination is performed at 900° C. to carry out a carbonization treatment (calcination process). The obtained nano-silicon-based anode material (a structure of nano-silicon/(silicon suboxide+amorphous carbon)) is pulverized, grinded and sieved to mix the active materials: conductive agent:PAA:SBR:CMC at a proportion of 73:12:2.5:5.6:6.9 to form a slurry. In mixing, CMC is first mixed with PAA then the active materials and conductive agents are premixed by means of dry blending before they are added to the solution of CMC and PAA. At last, SBR is added and uniformly mixed. The obtained slurry is applied to a copper foil by doctor blade coating. This sample is called Si/SiO$_x$/C.

Example 3

500 mL of 0.25 mM NaOH solution is prepared and continuously stirred at 200 rpm. 25 g of 200 nm silicon powder is added to the above NaOH solution to undergo a reaction for 4 hour, and then citric acid is added and stirred as a terminator. The terminator is added to adjust the pH value to be 7 so that silicon stops reacting with NaOH. Later 2.5 g of multi-layer graphene (MLG) is added and stirred for 12 hours to allow the nano-silicon powder effectively dispersed on MLG. High temperature calcination is performed at 900° C. to carry out a carbonization treatment (calcination process). The by-products, for example water-soluble salts such as Na$_2$CO$_3$, of the terminator and NaOH after calcination is washed off with deionized water after the obtained nano-silicon-based anode material (a structure of nano-silicon/(silicon suboxide+amorphous carbon)) is pulverized, grinded and sieved. The active materials:conductive agent: PAA:SBR:CMC are mixed at a proportion of 73:12:2.5:5.6: 6.9 to form a slurry. In mixing, CMC is first mixed with PAA then the active materials and conductive agents are premixed by means of dry blending before they are added to the solution of CMC and PAA. At last, SBR is added and uniformly mixed. The obtained slurry is applied to a copper foil by doctor blade coating. This sample is called Si/SiO$_x$/MLG/C.

Example 4

The anode material Si/SiO$_x$/MLG/C of Example 3 (5%) is mixed with a commercial graphite material, mesocarbon microbeads (MCMB, 95%) to form a slurry (active materials:conductive agent:PAA:SBR:CMC are mixed at a proportion of 93:3:0.67:1.5:1.83), and then subjected to an electrode plate preparation and to a battery assembly process. This sample is called 5 wt % Si/SiO$_x$/MLG/C+95 wt % mesocarbon microbead (MCMB).

Example 5

The anode material Si/SiO$_x$/MLG/C of Example 3 (15%) is mixed with a commercial graphite material, mesocarbon microbeads (MCMB, 85%) at a proportion shown in Example 4 to form a slurry, and then subjected to an electrode plate preparation and to a battery assembly process. This sample is called 15 wt % Si/SiO$_x$/MLG/C+85 wt % mesocarbon microbead (MCMB).

Comparative Example 1

Commercially available carbon-coated SiO$_x$ powder (0.8<x<0.95) is purchased to prepare electrode plates and a half-cell is assembled and subjected to tests in the same mixing process and proportion of Example 1. The results are compared with these of Example 3. This sample is called SiO$_x$ (commercial).

Comparative Example 2

The SiO$_x$ anode material of Comparative Example 1 is mixed with 95% of commercially available graphite material mesocarbon microbeads (the same proportion as in Example 4) to form a slurry, and then subjected to an electrode plate preparation and to a battery assembly process. Compared with Example 4, this sample is called 5 wt % SiO$_x$ (commercial)+95 wt % MCMB.

Comparative Example 3

The SiO$_x$ anode material of Comparative Example 1 is mixed with 85% of commercially available graphite material mesocarbon microbeads (the same proportion as in Example 4) to form a slurry, and then subjected to an electrode plate preparation and to a battery assembly process. Compared with Example 5, this sample is called 15 wt % SiO$_x$ (commercial)+85 wt % MCMB.

Figure 3:
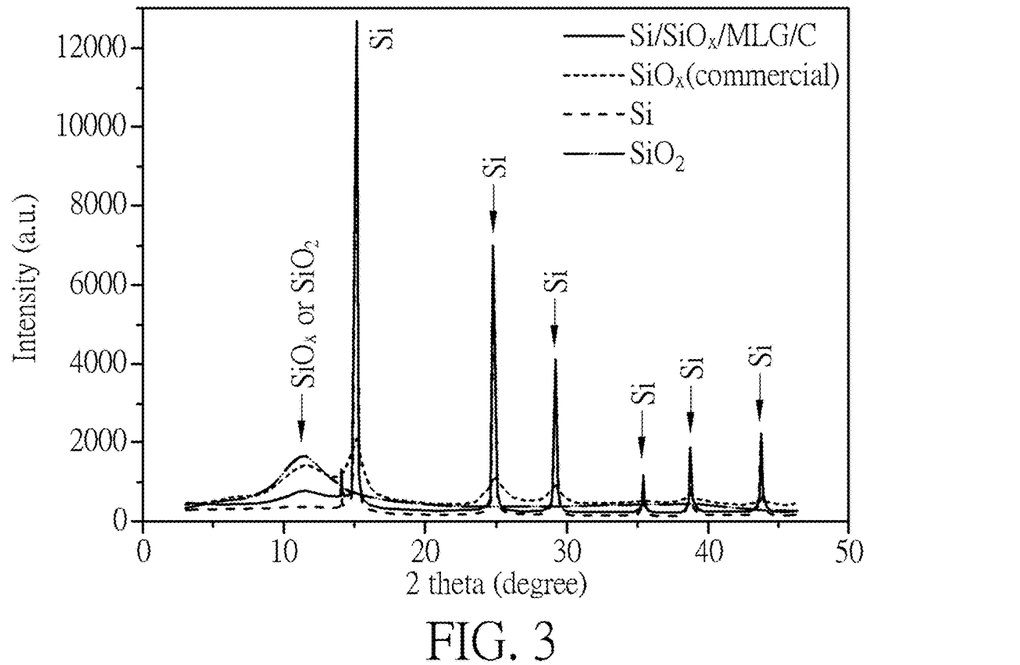
FIG. 3 illustrates a synchrotron X-ray diffraction (SXRD) pattern of $Si/SiO_x/MLG/C$, $SiO_x$ (commercial), Si and $SiO_2$ of the present invention.
Figure 4:
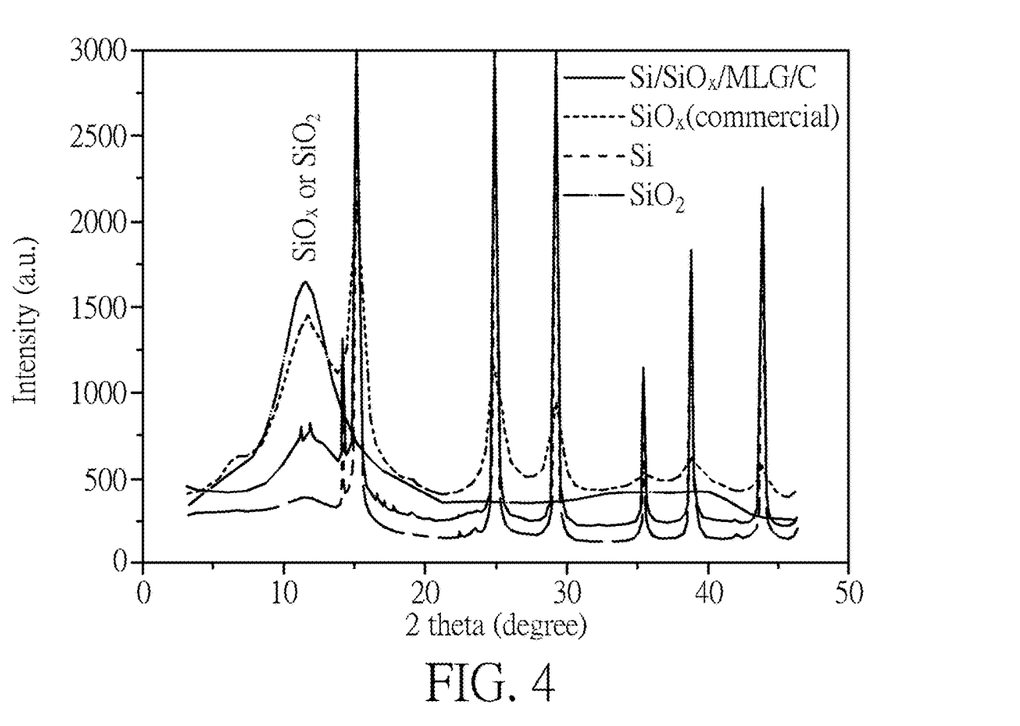
FIG. 4 shows a partial enlarged view of FIG. 3 of the present invention.

Please refer to FIG. 3. FIG. 3 illustrates a synchrotron X-ray diffraction (SXRD) pattern of Si/SiO$_x$/MLG/C, SiO$_x$ (commercial), Si and SiO$_2$ of the present invention. Please refer to FIG. 4. FIG. 4 shows a partial enlarged view of FIG. 3 of the present invention. As shown in the drawings, the position at Si peak and intensity of Si/SiO$_x$/MLG/C are very close to those of a standard Si with the difference that ~12° is the diffraction peak of the amorphous phase of SiO$_x$. The enlarged view of FIG. 4 clearly shows that a standard Si still has some minor peaks of SiO$_2$ here, which is confirmed by the comparison with a standard SiO$_2$. The reason why there are still some observed signals of SiO$_2$ on the standard Si is because nano-silicon tends to form a thin layer of native silicon oxide easily by oxidation in the atmosphere, and it is observed in the sample of Si/SiO$_x$/MLG/C that the signal of SiO$_2$ is much stronger than that of the Si standard, so it can be confirmed that this synthesis method can indeed turn a nano-silicon into a Si/SiO$_x$ composite sample. However, since X-ray is less sensitive to oxygen, the photoelectron spectroscopy (XPS) is instead needed to determine if it is SiO$_2$ or SiO$_x$. For the commercially available SiO$_x$, it is an amorphous phase material composed of Si and SiO$_2$. The current study of the structure of the material suggests that it is a two-phase material in which one Si atom may be simultaneously bonded to four neighbor Si atoms (Si phase) or to four neighbor O atoms (SiO$_2$ phase). But some studies have also pointed out that SiO$_x$ is a mono-phase material in which Si—Si bonding and Si—O bonding are randomly distributed throughout the whole structure. It is known from the results of SXRD that the material Si/SiO$_x$/MLG/C is indeed a material composed of amorphous phase SiO$_x$ and crystal phase of Si.

Figure 5:
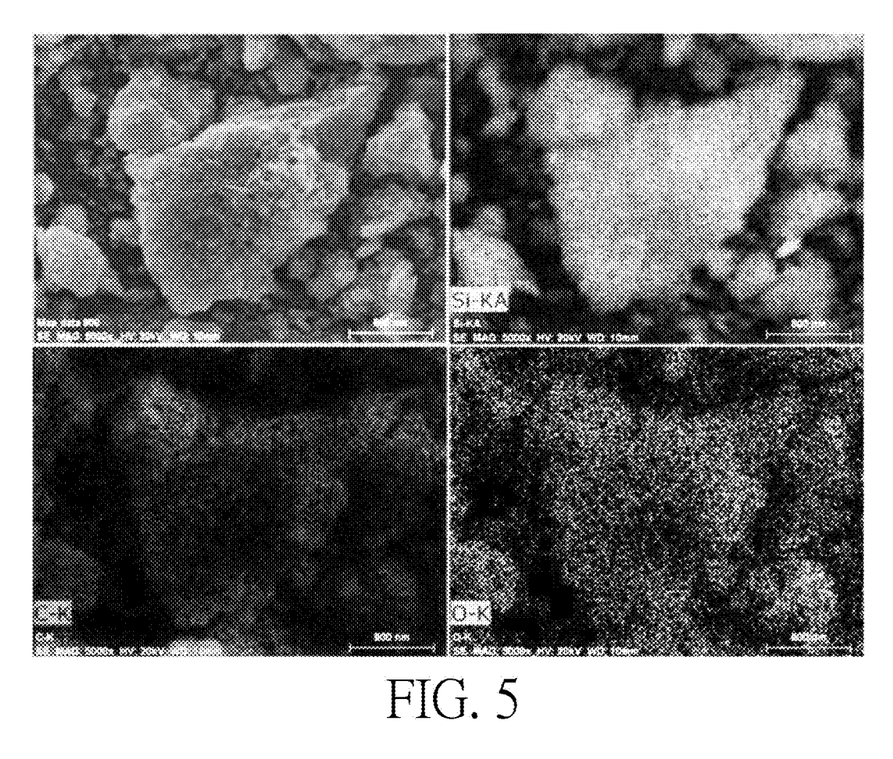
FIG. 5 illustrates an SEM image of the $Si/SiO_x/MLG/C$ sample of the present invention and an EDS mapping image of (Si, C, O) of the present invention.
Figure 6:
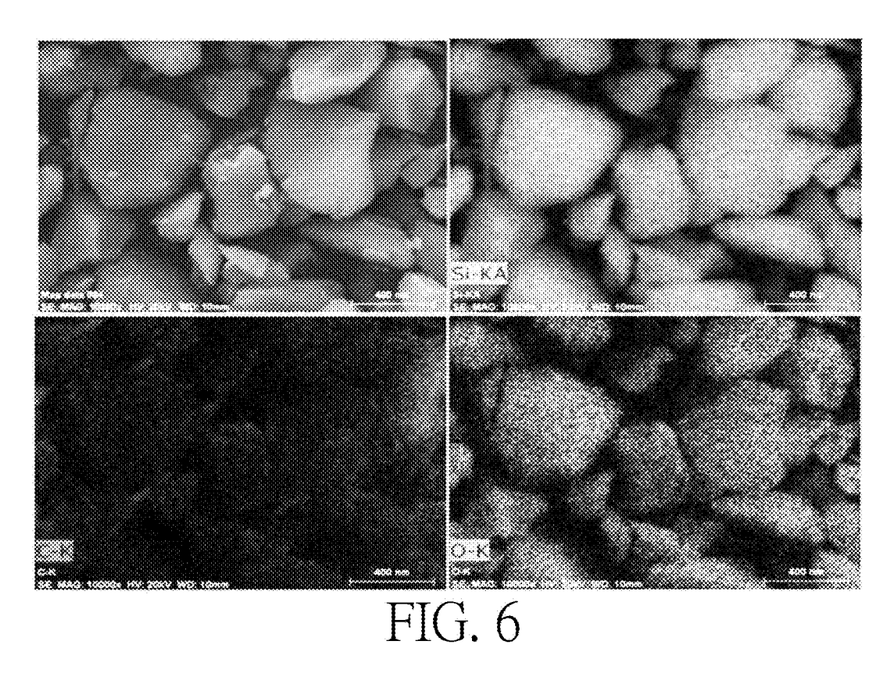
FIG. 6 illustrates an SEM image of the $SiO_x$ (commercial) sample and an EDS mapping image of (Si, C, O).

Please refer to FIG. 5. FIG. 5 illustrates an SEM image of the Si/SiO$_x$/MLG/C sample of the present invention and an EDS mapping image of (Si, C, O) of the present invention. Please refer to FIG. 6. FIG. 6 illustrates an SEM image of the SiO$_x$ (commercial) sample and an EDS mapping image of (Si, C, O). As shown in the drawing, FIG. 5 shows the SEM (scan electron microscope) image of the Si/SiO$_x$/MLG/C and its EDS mapping results which contains the three elements of Si, C and O. With respect to the silicon element, it can be observed that it is evenly distributed on the particles, and further it can be observed that the oxygen element and the carbon element have a higher concentration at the outer periphery of the particles and in the core part the concentration of oxygen element and the carbon element is lower. Hence, it may be inferred along with the results of SXRD that the major material composition of the outer shell is C and SiO$_x$ while the major material composition in the inner core is Si, which verifies the concept of the core-shell material which is proposed by the present invention. To be compared with the SiO$_x$ (commercial) sample in FIG. 6, the EDS mapping results shows that C, Si, O are uniformly distributed on the particles with a relatively lower content of C because the commercial product is prepared by a high-temperature gas phase method and the composition of the entire material is uniform with the pulverization is finally carried out before the carbon coating is carried out.

Figure 7:
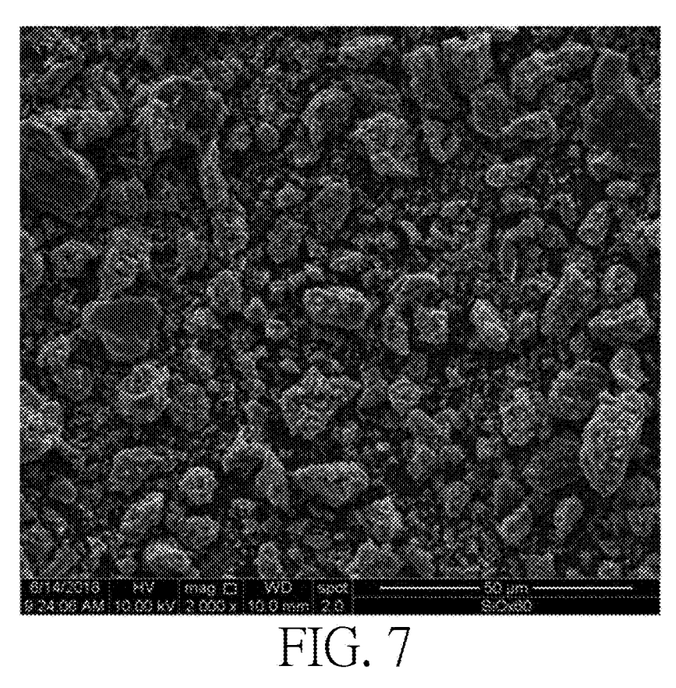
FIG. 7 illustrates an SEM image of the $Si/SiO_x/C$ sample (Example 2) of the present invention.
Figure 8:
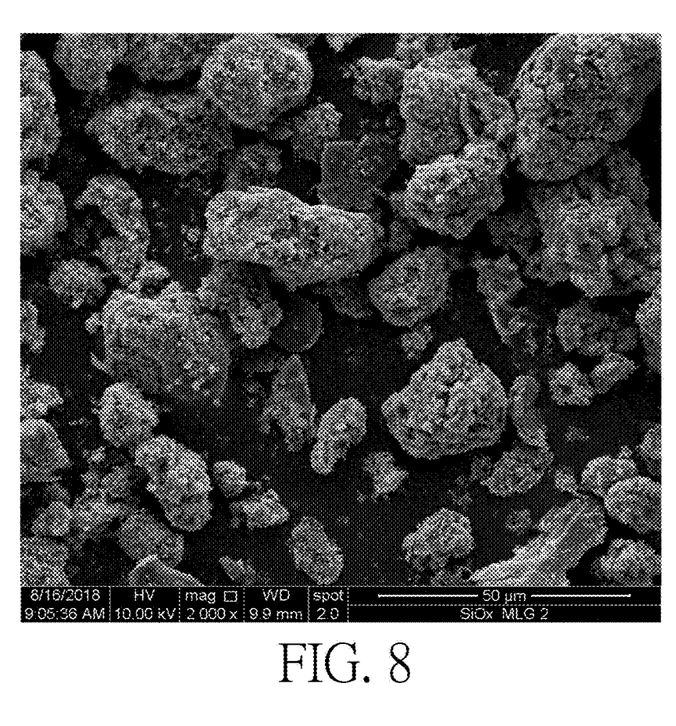
FIG. 8 illustrates an SEM image of the $Si/SiO_x/MLG/C$ sample (Example 3) of the present invention.

Please refer to FIG. 7. FIG. 7 illustrates an SEM image of the Si/SiO$_x$/C sample (Example 2) of the present invention. Please refer to FIG. 8. FIG. 8 illustrates an SEM image of the Si/SiO$_x$/MLG/C sample (Example 3) of the present invention. As shown in drawing, it can be clearly observed that the addition of MLG as a carrier of Si/SiO$_x$ in the process reduces the formation of finer powders, makes the slurry mixing process easier and makes the dispersion more uniform. Once peeling occurs, the electrode's capacity would be drastically reduced and the electrical impedance is increased. It can be observed from the comparison between Example 2 and Example 3 that the Coulombic efficiency in the first circle is improved because of the improvement of the dispersion so that Si/SiO$_x$ is less likely to crack or to peel during the charging and discharging process to improve the resultant Coulombic efficiency although the addition of MLG makes the reversible capacity of the Si/SiO$_x$/MLG/C composite material decrease and the capacitance of the MLG itself is lower than that of Si/SiO$_x$.

Figure 9:
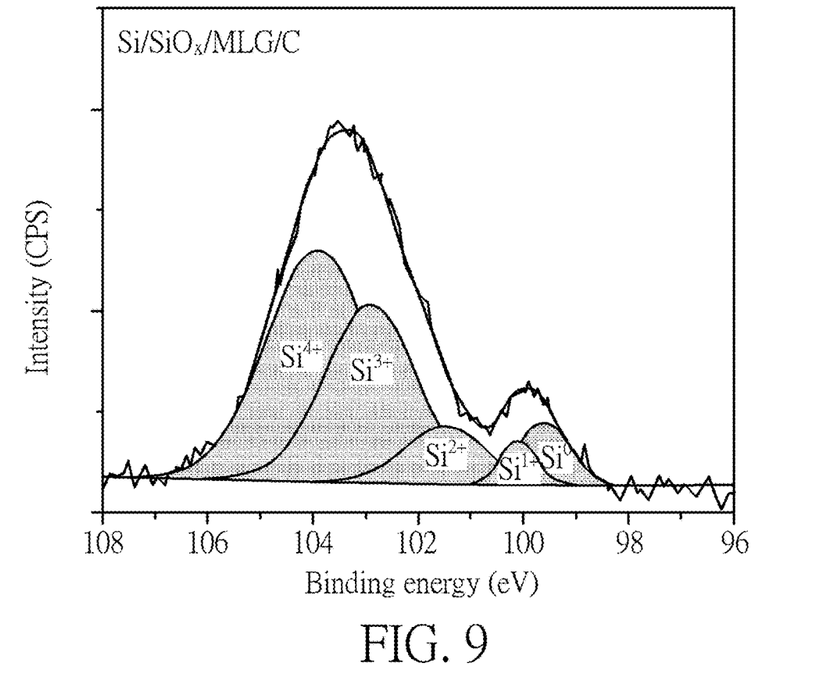
FIG. 9 illustrates a spectrum analysis of the XPS $Si_{2p}$ of the $Si/SiO_x/MLG/C$ of the present invention.
Figure 10:
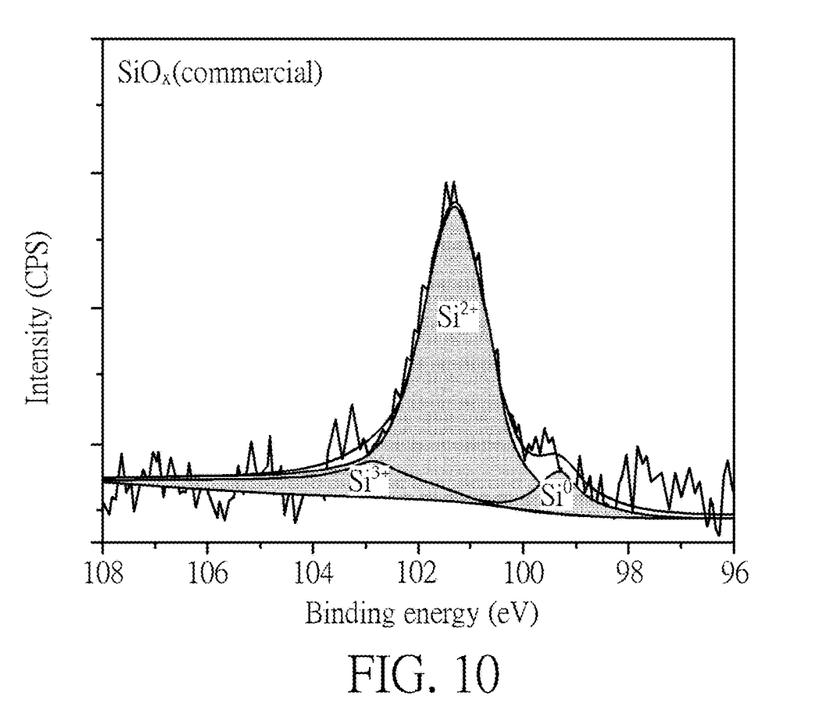
FIG. 10 illustrates the spectrum analysis of the XPS $Si_{2p}$ of $SiO_x$ (commercial) of the present invention.

Please refer to FIG. 9. FIG. 9 illustrates a spectrum analysis of the XPS Si$_{2p}$ of the Si/SiO$_x$/MLG/C of the present invention. Please refer to FIG. 10. FIG. 10 illustrates the spectrum analysis of the XPS Si$_{2p}$ of SiO$_x$ (commercial) of the present invention. As shown in the drawing, the valences of Si on the surface of the sample of Si/SiO$_x$/MLG/C are from Si$^0$ to Si$^{4+}$. The semi-quantitative analysis results of C, O, Si by XPS full spectrum scan of Table 2 show that the percentages in the Si/SiO$_x$/MLG/C sample are 31%, 39%, 30%, but the percentages in the SiO$_x$ (commercial) sample are 87%, 10%, 3%. The large difference mainly resides in the XPS analysis mainly on the surface analysis (depth ~10 nm). Because the SiO$_x$ (commercial) sample is prepared by a high-temperature gas phase method before the chemical vapor deposition carbon coating is carried out, more signals of carbon is detected by the analysis of the SiO$_x$ (commercial) sample. For the Si/SiO$_x$/MLG/C sample, the contents of the surface composition of C, O, Si are close to one another because the material composition of the shell is SiO$_x$/C. Further to analyze the valence distribution of Si$_{2p}$ individual peaks (Table 3), it is known from the calculated results of the analysis of different Si valences that the parameter x would be 1.56 if the material is averagely represented by an general formula SiO$_x$. However, when reviewing the prior art references, it is estimated that the unit capacity per gram would be lower than 800 mAh g$^{-1}$ for SiO$_x$ with x=1.56 but the reversible capacity of the Si/SiO$_x$/MLG/C sample from Table 1 is shown to be 1814 mAh g$^{-1}$ so it is confirmed again that the sample is a composite material with an outer shell of SiO$_x$/C and with an inner core of Si/MLG. On the contrary, for the SiO$_x$ (commercial) sample the main valence of Si is 2+ and x is 0.94 from the calculation of the valence analysis, which is pretty close to the oxygen content disclosed in the patent of the supplier.

TABLE 1

Semi-quantitative analysis results of C, O, Si by XPS full spectrum scan

| Atomic % | C | O | Si |
|---|---|---|---|
| Si/SiO$_x$/MLG/C | 31% | 39% | 30% |
| SiO$_x$ (commercial) | 87% | 10% | 3% |

TABLE 2

Analysis of individual peaks of the valence distribution of XPS Si$_{2p}$ spectrum

| Si valence (Area %) | Si$^0$ | Si$^{1+}$ | Si$^{2+}$ | Si$^{3+}$ | Si$^{4+}$ | SiO$_x$ |
|---|---|---|---|---|---|---|
| Si/SiO$_x$/MLG/C | 7% | 3% | 9% | 33% | 48% | SiO$_{1.56}$ |
| SiO$_x$ (commercial) | 5% | 0% | 85% | 9% | 0% | SiO$_{0.94}$ |

Figure 11:
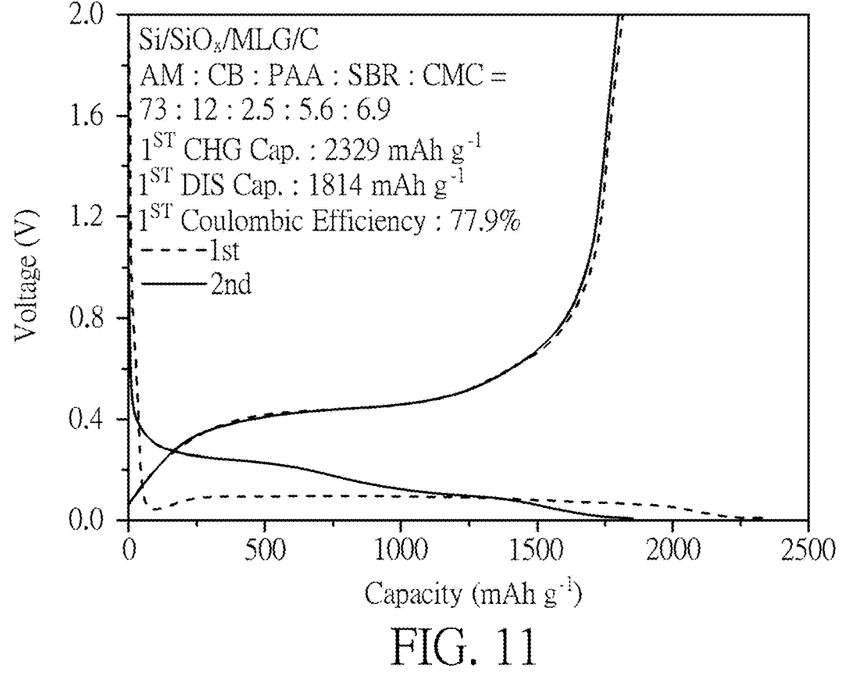
FIG. 11 illustrates a charging and discharging curve of a half-cell of the $Si/SiO_x/MLG/C$ material according to Example 3 of the present invention.
Figure 12:
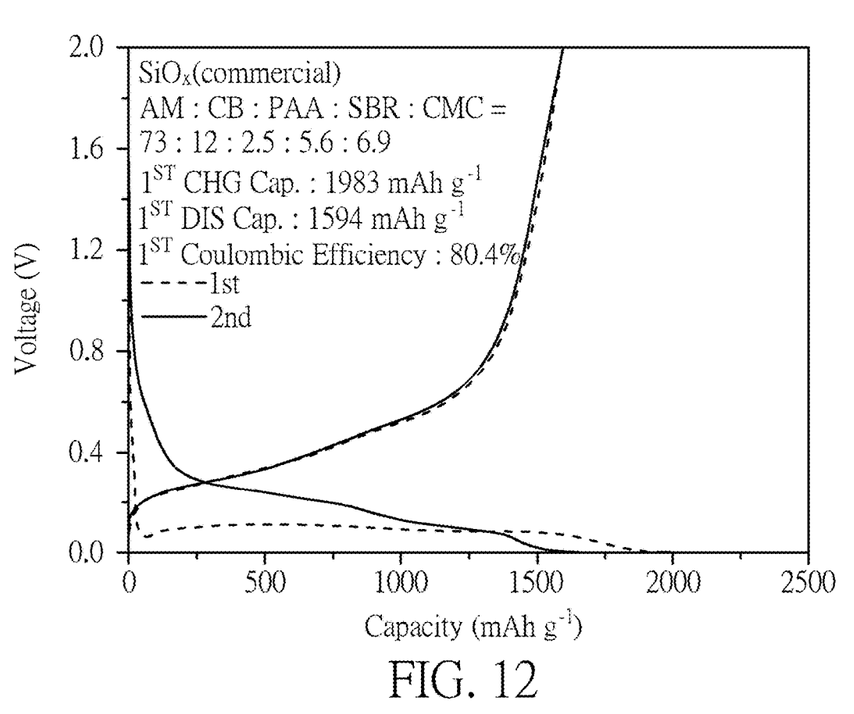
FIG. 12 illustrates a charging and discharging curve of a half-cell of the comparative example 1 of the $SiO_x$ (commercial) material.

Please refer to FIG. 11. FIG. 11 illustrates a test chart of a half-cell of the Si/SiO$_x$/MLG/C material according to Example 3 of the present invention. Please refer to FIG. 12. FIG. 12 illustrates a test chart of a half-cell of the comparative example 1 of the SiO$_x$ (commercial) material. As shown in FIG. 11, FIG. 11 consists of the 0.4 V redox characteristic platform of Si and the oblique rising line of SiO$_x$, while FIG. 10 shows the characteristic charging and discharging curve of SiO$_x$ (commercial), but the two materials have problems of low Coulombic efficiency and of poor battery life when used individually so only the first cycle Coulombic efficiency and the reversible capacitance are measured in the tests. A comparison of the two shows that the sample of Si/SiO$_x$/MLG/C has a high reversible capacity (1814 mAh g$^{-1}$) while the SiO$_x$ (commercial) sample has a commercially average capacity up to 1600 mAh g$^{-1}$. The Coulombic efficiency of the Si/SiO$_x$/MLG/C sample is slightly 2% lower. However, it is observed from the graphite-mixed test results in Table 1 that the first cycle Coulombic efficiency of the two samples is close to each other in spite of 5% mixing or of 15% mixing. Accordingly it is inferred that the Coulombic efficiency of the Si/SiO$_x$/MLG/C sample is slightly lower than that of the SiO$_x$ (commercial) sample when Si/SiO$_x$/MLG/C is used alone because there is no other graphite material to help suppress its volume expansion. The SiO$_x$ (commercial) has slightly higher Coulombic efficiency because there is a large amount of Li$_2$O and Li$_4$SiO$_4$ to be helpful in suppressing its volume expansion when it is activated after the first circle. In accordance with these, from Table 3 it is known that each of the two materials has its own problem of lower first cycle Coulombic efficiency due to respective different reasons. For the SiO$_x$ (commercial), it needs addition lithium to form Li$_2$O and Li$_4$SiO$_4$ at its first cycle. But for Si/SiO$_x$/MLG/C, the first cycle Coulombic efficiency is lower owing to the volume expansion of its core Si to result in breaking or cracking. Surely, its outer shell of SiO$_x$ still consumes some of the lithium to form Li$_2$O and Li$_4$SiO$_4$ to help suppress the volume expansion. By absorbing its volume expansion along with the mixed graphite, the first cycle Coulombic efficiency of Examples 4 and 5 and Comparative Examples 2 and 3 are similar. Further, the unit gram capacity of the anode material formed by mixing graphite of the same proportion is higher than that of the SiO$_x$ (commercial) sample because the Si/SiO$_x$/MLG/C sample has a higher reversible capacity.

TABLE 3

Tests of half-cells of the Si/SiO$_x$/MLG/C materials in examples and of SiO$_x$ (commercial) sample.

| | Composition of anode material | Charging capacity of the first cycle (mAh g$^{-1}$) | Discharging capacity of the first cycle (mAh g$^{-1}$) | First cycle Coulombic efficiency (%) | Residual capacity rate after 100 cycles (%) |
|---|---|---|---|---|---|
| Example 1 | Si/SiO$_x$/C-0.5h | 2986 | 1986 | 66.5 | —* |
| Example 2 | Si/SiO$_x$/C | 2643 | 1914 | 72.4 | —* |
| Example 3 | Si/SiO$_x$/MLG/C | 2329 | 1814 | 77.9 | —* |
| Example 4 | 5 wt % Si/SiO$_x$/MLG/C + 95 wt % MCMB | 470 | 427 | 90.9 | 93.1 |
| Example 5 | 15 wt % Si/SiO$_x$/MLG/C + 85 wt % MCMB | 644 | 570 | 88.5 | 80.3 |
| Comparative Example 1 | SiO$_x$ (commercial) | 1983 | 1594 | 80.4 | —* |
| Comparative Example 2 | 5 wt % SiO$_x$ (commercial) + 95 wt % MCMB | 450 | 411 | 91.3 | 88.4 |
| Comparative Example 3 | 15 wt % SiO$_x$ (commercial) + 85 wt % MCMB | 605 | 537 | 88.7 | 62.0 |

Figure 13:
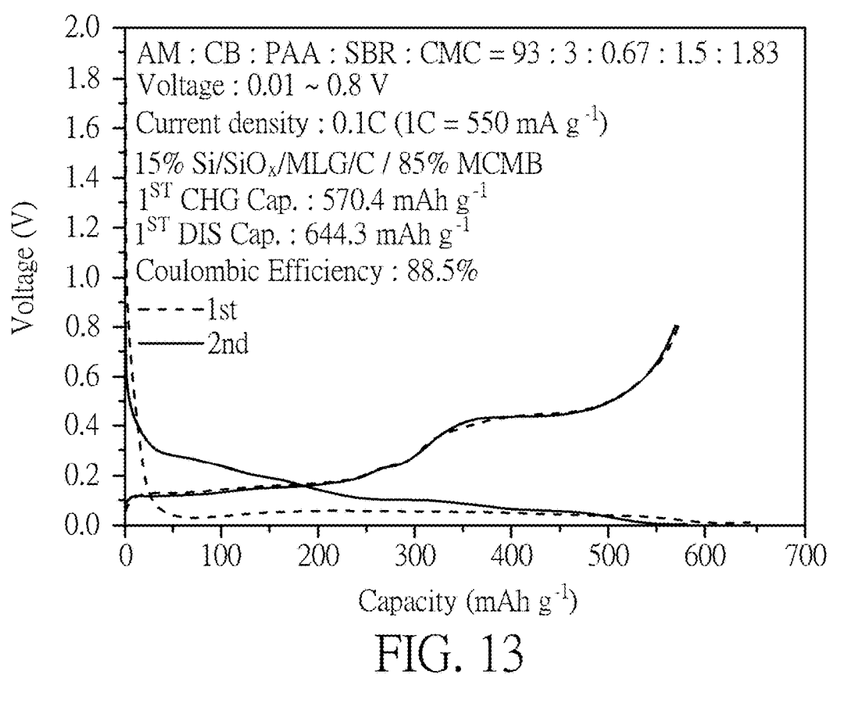
FIG. 13 illustrates a half-cell test of the 15 wt % $Si/SiO_x/MLG/C+85$ wt % MCMB material according to Example 5 of the present invention.
Figure 14:
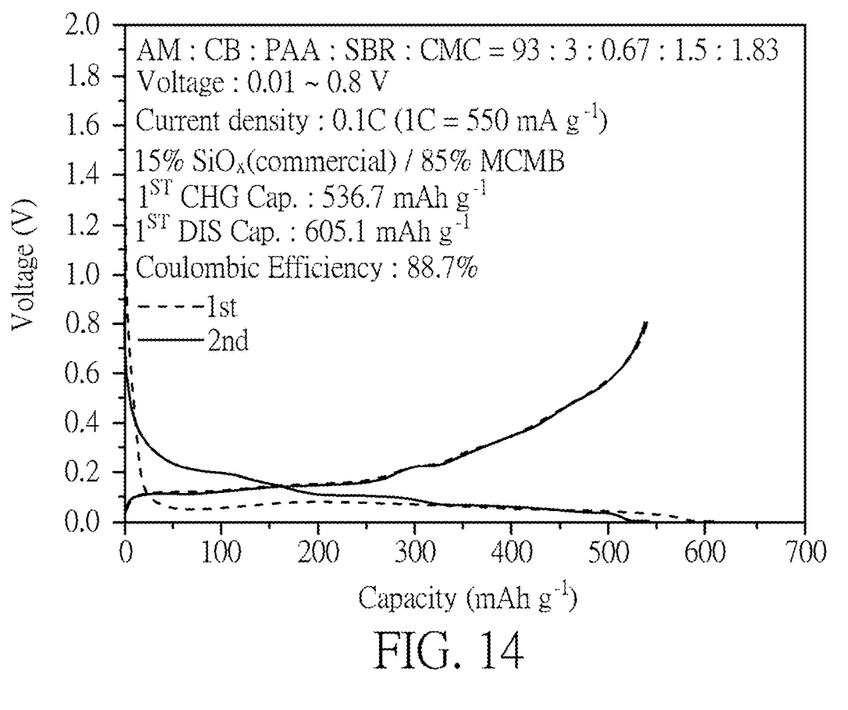
FIG. 14 illustrates a half-cell test of 15 wt % $SiO_x$ (commercial)+85 wt % MCMB material of the present invention.
Figure 15:
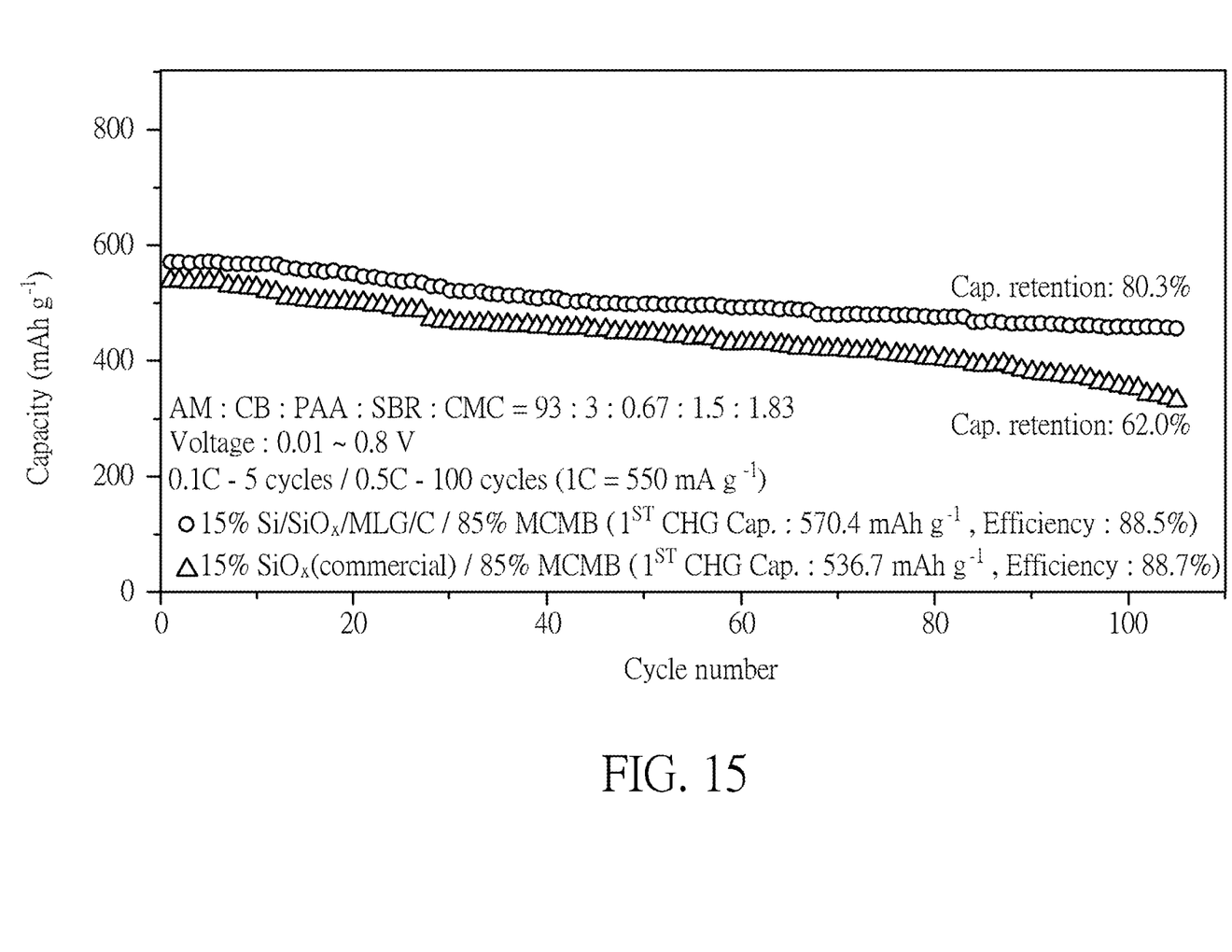
FIG. 15 illustrates a half-cell test chart of long charging and discharging cycle test of the material of Example 5 (15 wt % Si/SiO$_x$/MLG/C+85 wt % MCMB) and the material of Comparative Example 3 (15 wt % SiO$_x$ (commercial)+85 wt % MCMB).

Please refer to FIG. 13. FIG. 13 illustrates a half-cell test chart of the 15 wt % Si/SiO$_x$/MLG/C+85 wt % MCMB material according to Example 5 of the present invention. Please refer to FIG. 14. FIG. 14 illustrates a half-cell test chart of 15 wt % SiO$_x$ (commercial)+85 wt % MCMB material of the present invention. Please refer to FIG. 15. FIG. 15 illustrates a half-cell test chart of long charging and discharging cycle of the material of Example 5 (15 wt % Si/SiO$_x$/MLG/C+85 wt % MCMB) and the material of Comparative Example 3 (15 wt % SiO$_x$ (commercial)+85 wt % MCMB). As shown in drawing, as far as the capacity is concerned, silicon still has higher capacity contribution although only 15% of Si/SiO$_x$/MLG/C or of SiO$_x$ (commercial) is mixed so the silicon-oxygen-based materials still dominate the charging-discharging curves. Due to the 85% graphite anode, it shows a better first cycle Coulombic efficiency and cycle life. FIG. 15 illustrates a half-cell test of long charging and discharging cycle of the material of Example 5 (15 wt % Si/SiO$_x$/MLG/C+85 wt % MCMB) and the material of Comparative Example 3 (15 wt % SiO$_x$ (commercial)+85 wt % MCMB) with 0.5 C current (1 C=550 mA g$^{-1}$). Example 5 has better stability. After 5 cycles of 0.1 C charging and discharging cycles and 100 cycles of a long cycle test of 0.5 C, the capacity retention is still kept over 80%. However, for Comparative Example 3, under the same conditions, the capacity decreases more after 80 cycles at 0.5 C, and the capacity retention drops to only 62% after 100 cycles.

The anode material of the present invention uses nano-Si as a raw material to undergo alkali etching and Si/SiO$_x$ are dispersed on the surface of the MLG by a wet dispersion method in the presence of a solvent, and finally it is coated with an organic pyrolysis carbon layer so that nano-Si can be uniformly distributed in the composite material. MLG along with SiO$_x$ slows down the volume expansion effect and cracking of Si which are caused by the charging and discharging cycles. 15% of the anode material with a commercial graphite anode material is physically mixed to form a slurry, to form an electrode and finally fabricated to be a CR2032 battery. The measured reversible capacity is about ~570 mAh g$^{-1}$ after testing, which is ~1.6 time higher than that of a pure graphite anode material (~350 mAh g$^{-1}$) with the first circle Coulombic efficiency up to ~89%, and its capacity retention is 80% after 100 cycles. Compared with commercial SiO$_x$ material, it has better capacity retention and advantages of process cost so it is suitable to serve as an anode material for the lithium ion batteries of high energy density.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An anode material of nano-silicon having multilayer-graphene as a carrier and coated with silicon suboxide and with an amorphous carbon layer, comprising:
   multilayer-graphene serving as a carrier;
   nano-silicon adsorbed on said multilayer-graphene, both said multilayer-graphene and said nano-silicon serving as a core;
   a silicon suboxide and amorphous carbon layer together coated on said core; and
   a plurality of buffering holes disposed on said anode material to provide buffering space.

2. The anode material of nano-silicon having multilayer-graphene as a carrier and coated with silicon suboxide and with an amorphous carbon layer of claim 1, wherein said nano-silicon has a particle size in a range of 50 nm to 300 nm.

3. The anode material of nano-silicon having multilayer-graphene as a carrier and coated with silicon suboxide and with an amorphous carbon layer of claim 1, further comprising hydroxyl groups and said nano-silicon is attached to said multilayer-graphene by means of the hydroxyl groups.

4. The anode material of nano-silicon having multilayer-graphene as a carrier and coated with silicon suboxide and with an amorphous carbon layer of claim 1, wherein said amorphous carbon layer is obtained from an organic carbon source through an organic pyrolysis process, and said organic carbon source is selected from a group consisting of glucose, sucrose, citric acid, polyvinyl alcohol, polyethylene glycol, polyacrylonitrile, asphalt, a phenolic resin, polyaniline, an epoxy resin, polyvinylpyrrolidone, and an unsaturated hydrocarbon gas.

* * * * *